United States Patent [19]

Tally, Jr.

[11] 4,046,007
[45] Sept. 6, 1977

[54] COMBINED LIGHTHOUSE AND WIND DIRECTION INDICATOR

[76] Inventor: Joseph O. Tally, Jr., 560 N St. SW., Washington, D.C. 20024

[21] Appl. No.: 742,444

[22] Filed: Nov. 17, 1976

[51] Int. Cl.² .............................................. G01P 13/02
[52] U.S. Cl. ..................................... 73/188; 350/257
[58] Field of Search ..................... 73/188, 189; 40/37; 46/53; 116/173; 350/256, 257; 33/397

[56] References Cited

U.S. PATENT DOCUMENTS

| | | | |
|---|---|---|---|
| 215,028 | 5/1879 | Turner | 73/188 |
| 1,359,406 | 11/1920 | McCarty | 73/188 |
| 1,605,086 | 11/1926 | Watson | 73/188 |
| 3,242,332 | 3/1966 | Temkin | 40/37 X |
| 3,478,585 | 11/1969 | Scannell | 73/188 |
| 3,537,310 | 11/1970 | Barrett | 73/188 |

*Primary Examiner*—Daniel M. Yasich
*Attorney, Agent, or Firm*—J. Gibson Semmes

[57] ABSTRACT

Combined Lighthouse and Wind Direction Indicator including a tower wherein the tower houses a light source and a signal target in coactive relationship, the target preferably consisting of a luminescent globe, the globe being ring mounted for a semi-floating, reactive positioning in response to the vectors of prevailing winds. The light source is adapted to present a diffused/suffused aura about the globe, the aura being of less intensity than the intensity of the light which may be focussed within the globe, per se.

6 Claims, 3 Drawing Figures

COMBINED LIGHTHOUSE AND WIND DIRECTION INDICATOR

BACKGROUND OF THE INVENTION

Whereas the concept of adapting a remote light source to a distant lens-like target is well-known, reference the U.S. Pat. Nos. to Chew, 2,481,083, Rait, 588,878, and Dillion, 2,676,312, the within described concept of gimbal-mounting a freely movable globular signal is novel. While it is true that Braddon in U.S. Pat. No. 2,497,065 has devised means which are reactive to wind bending moments of the tower, per se, such concept is distinct from that of applicant's in which the basic components are coactively arranged within a fixed tower. In addition, the novel means of adapting a fixed ring mounted globe which is open at a bottom end and stabilized laterally and vertically for a floatingly responsive direction signal have not been described in the art of record. Other art of interest includes the following U.S. Pat. Nos.: Howard, Pat. 1,989,095; Werner, Pat. 1,976,706; Tyler, Pat. 1,942,039; as well as Cameron, Pat. 1,422,922; McCarty, Pat. 1,359,406 and Hutchinson, Pat. 1,404,962.

DESCRIPTION OF THE PREFERRED EMBODIMENTS

Figure 1:
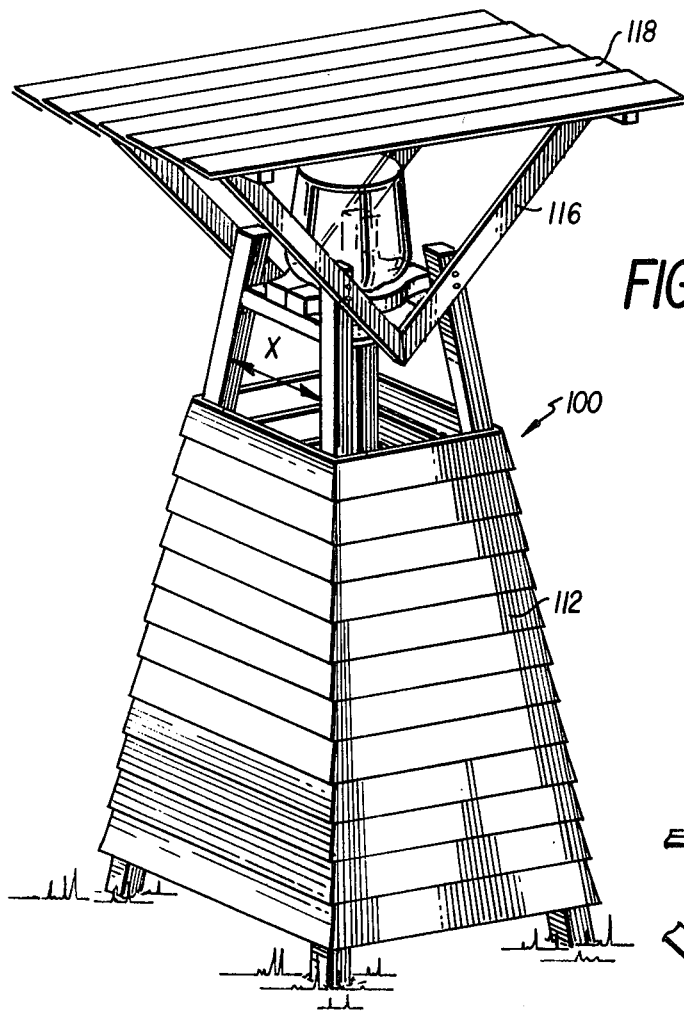
FIG. 1 is a view in perspective of invention.
Figure 2:
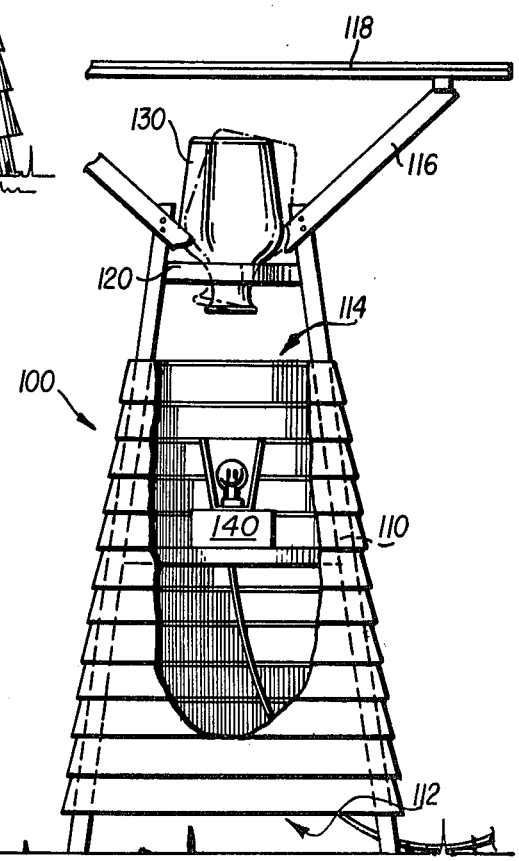
FIG. 2 is a view in side elevation thereof, a portion being broken away to illustrate to coactive relationship between light source and signal target.

The tower 100 comprises plural uprights 110 joined exteriorly by appropriate wall forming means; in the present instance, the same being shown to be clapboard. The wall terminates at the bottom a suitable distance above the ground to provide a wind vent or draft 112 and in the uppermost extreme to provide a complemental wind vent 114 and plain view, both near and far, while at the same time being aesthetically pleasing. The respective uprights are adapted to secure roof stabilizer supports 116, said supports bearing the roof structure 118. Significantly, the uprights are spaced apart at the top a distance which is less than the outer diameter of the globe, to prevent its loss in high winds.

Figure 3:
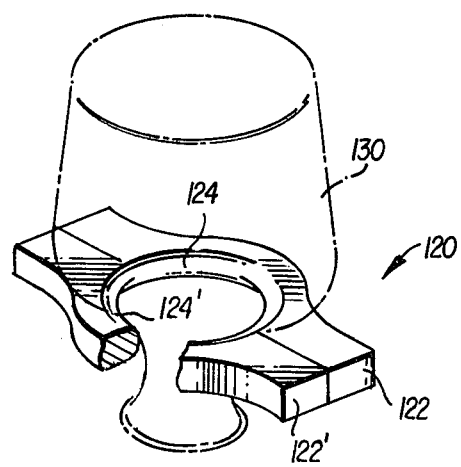
FIG. 3, taken along the lines 3—3 of FIG. 2, is an enlarged horizontal cross-section of the means for mounting the signal.

Interposed between the supports is the fixed ring mount 120, reference FIG. 3, said mount being preferably formed of contiguously disposed sections 122 and 122'. Sections 122–122' respectively define the arcuate voids 124 and 124' providng the seat for the signal glob 130 as will be hereinafter described. As indicated, these sections 122-122' are retained on ends by opposed lateral stringers, the sides of the sections 122-122' being sufficiently spaced from the corresponding edges of the tower to permit the artificial light beam to contact not only the interior of the globe, but also its exterior. This permits presentation of a suffused aura about the globe. Clearly, this support may be also made of any suitable composite substance such as a grate or stringers, suspending the mount for the globe.

The essence of the fixed ring mount is that it must be sufficiently designed to insure lateral and vertical stability to the wind-responsive globe 130. A square seat for the globe may also be formed to accomplish the same function.

While not apparent from the drawings, the neck of the open end of the flared bottom of the globe must be dimensionally less in circumference or exterior area than the voids 124-124' combined.

The globe, by virtue of its open flared-lip end 110 at the bottom, is adapted to equalized air-pressure responsiveness. As indicated, the wind vents 112 and 114 are specifically formed to insure a natural updraft during even the slightest winds. This naturally directed updraft lightens the globe load on the ring mount, whereby to give to the globe a semi-floating characteristic, enhancing thereby its restrained maneuverability. Thus, as the globe is in semi-floating relationship to the ring mount, it is appropriately restrained by its flared lip bearing upwardly against the mount 120. Upon the occasion of the driven wind passing in the vicinity of the lighthouse, the globe is effectively responsive to the influence of the winds to cause tilt to the globe, opposite the direction from whence the wind prevails. The vent 112 serves to direct wind upward and give the globe an air cushion effect and the vent 114 serves to direct wind to the globe laterally to deflect same and thereby establish its variable wind direction, signal position.

Thus, on lighting of the source 140, the indirect signal target effect is such as to signal to the navigator or landlubber the source of the winds at substantial distances which are remote from the lighthouse. Whereas the globe may be made of any substance having a somewhat reflective or luminescent exterior, I prefer the use of a globe or bottle which itself is of transparent or translucent composition and which can be clear or colored. The light source is also so positioned as to provide an attractive aura using white or any colored light about the driven globe, further attracting attention as a signal device and providing as pleasing appearance. By design, the light is directed upwardly toward the luminescent target whereby the target 130 is itself within and on its surface more outstanding, as a responsive element, to the light than is the suffused and/or diffused light thereabout, reflecting from the roof of the device. Whereas the globe may comprise a trasparent or translucent substance, it is also desirably that the globe, in simpler form, may comprise a hollow element which is light reflective on its exterior alone. Additionally, the globe may be light reflective both interioraly and exterioraly while at the same time being translucent and/or generally transparent.

I claim:

1. A lighthouse and wind direction indicator comprising:
    A. a tower having top and bottom, said tower defining adjacent the top a fixed ring mount to support an illuminable target; said tower being open to the atmosphere at both the bottom and top thereof;
    B. a movable and illuminable target globe, mounted in the ring mount adjacent to top of the tower, said globe having a closed end at its top and an open, flared-lip end at its bottom, the globe coactively engaging the ring mount intermediate its top and bottom;
    C. a light source within the tower, remote from the illuminable target, said light source being trained at least in part toward the target to illumine same; whereby upon exposure of the globe to the prevailing winds passing from the bottom to the top of the tower, the globe is restrainedly floated vertically and whereby the winds passing from the sides, the globe will tilt within the ring mount and as such, the globe is rendered directionally responsive to the prevailing winds.

2. The lighthouse and wind direction indicator of claim 1 wherein the target comprises a transparent globe.

3. The apparatus according to claim 2, wherein the light source directs light to the interior of the target as well as exteriorly thereof to present a suffused aura thereabout.

4. The lighthouse and wind direction indicator of claim 1, wherein the target comprises a translucent globe.

5. The apparatus according to claim 4, wherein the light source directs light to the interior of the target as well as to the exterior thereof, to present a suffused aura thereabout.

6. The lighthouse and wind direction indicator of claim 1, wherein the target comprises a globe which is light reflective exteriorly.

* * * * *